United States Patent
Burdick et al.

(10) Patent No.: US 10,515,389 B1
(45) Date of Patent: Dec. 24, 2019

(54) SYSTEMS AND METHODS FOR MANAGING PRODUCT SAMPLE ADVERTISEMENTS

(71) Applicant: Amazon Technologies, Inc., Reno, NV (US)

(72) Inventors: Melissa Naarden Burdick, Seattle, WA (US); James Wallace Scythes, Seattle, WA (US); Cynthia Lee Walker, Federal Way, WA (US); Jeremiah Lee Morgan, Seattle, WA (US); Eric Just Mickelsen, Seattle, WA (US); Lisa Diane Crowder, Edmonds, WA (US)

(73) Assignee: Amazon Technologies, Inc., Reno, NV (US)

( * ) Notice: Subject to any disclaimer, the term of this patent is extended or adjusted under 35 U.S.C. 154(b) by 980 days.

(21) Appl. No.: 14/096,438

(22) Filed: Dec. 4, 2013

(51) Int. Cl.
    *G06Q 30/02* (2012.01)
(52) U.S. Cl.
    CPC ..... *G06Q 30/0263* (2013.01); *G06Q 30/0255* (2013.01)
(58) Field of Classification Search
    None
    See application file for complete search history.

(56) References Cited

U.S. PATENT DOCUMENTS

| 2010/0057548 A1* | 3/2010 | Edwards | G06Q 30/0211 705/14.13 |
| 2010/0262521 A1* | 10/2010 | Robinson | G06Q 10/08 705/29 |
| 2013/0132179 A1* | 5/2013 | Wu | G06Q 30/02 705/14.23 |
| 2015/0120599 A1* | 4/2015 | Deshpande | G06Q 10/0835 705/336 |

OTHER PUBLICATIONS

"The Forward Reserve Warehouse Sizing and Dimensioning Problem", by Jinxiang Gu. Dissertation, School of Industrial and Systems Engineering, Georgia Institute of Technology. Dec. 2005. (Year: 2005).*

* cited by examiner

*Primary Examiner* — William A Brandenburg
(74) *Attorney, Agent, or Firm* — Eversheds Sutherland (US) LLP (57) ABSTRACT

According to one or more embodiments of the disclosure, a method is provided. The method may include receiving, by at least one server comprising one or more processors, from a user device, a request for a web page comprising product detail information associated with a focus product identifier. The method may also include receiving an advertisement request associated with the focus product identifier. Furthermore, the method may include determining, based at least in part on the focus product identifier, a product sample identifier associated with a product sample to offer with the product. Additionally, the method may include selecting, based at least in part on the product sample identifier, a product sample advertisement.

21 Claims, 4 Drawing Sheets

SYSTEMS AND METHODS FOR MANAGING PRODUCT SAMPLE ADVERTISEMENTS

BACKGROUND

Online advertising to consumers plays a significant role in the operation of e-commerce. As such, one goal of advertisers is to identify consumers who are most likely to purchase their product based on consumer online interactions. In particular, advertisers may wish to identify opportunities to offer free product samples to consumers.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for managing product sample advertisements. Broadly, the systems and methods described herein may enable a service provider to select, render, generate, and/or otherwise provide advertisements for product samples (hereinafter referred to as product sample advertisements). More specifically, the service provider may select certain product sample advertisements in order to offer/advertise the associated product sample with another focus product.

For example, a user may direct, instruct, and/or otherwise cause the web browser in a user device to navigate to a web page served by one or more service provider servers of the service provider. The one or more service provider servers may hereinafter be referred to in the singular, though it should be appreciated that multiple servers are also contemplated. In certain embodiments, the web page may include product information associated with a focus product (e.g., a product that is of interest or primary interest to the user). For instance, the focus product may be a slow cooker the user is interested in, and the web page may include product information about the slow cooker (e.g., size, weight, features, color, and/or any other type of product information).

Furthermore, the web page may include instructions that cause the web browser to transmit an advertisement request to the service provider server. The advertisement request may include and/or may otherwise be associated with a focus product identifier associated with the slow cooker. The service provider server may receive the advertisement request and in response, may determine one or more product samples to offer with the slow cooker. For example, the service provider server may determine that a particular sample of a flavor of soup should be offered with the slow cooker. In certain implementations, the sample may be of a smaller size and/or quantity than typically offered by the service provider server. For instance, the soup sample may be a single packet whereas the service provider may typically sell the particular flavor of soup in a large can and/or in multiple serving quantities.

In order to identify the product sample(s) (e.g., the soup sample) to offer and/or advertise with the focus product (e.g., the slow cooker), the service provider server may receive, with the advertisement request from the web browser, the focus product identifier. As such, the service provider server may determine, based at least in part on the focus product identifier, one or more product sample identifiers associated with the product samples to offer with the focus products. Referring back to the previous example, the service provider server may determine, based on the focus product identifier associated with the slow cooker, the product sample identifier associated with the soup sample. In certain implementations, such a determination may be further based on the location of warehouses owned and/or otherwise associated with the focus product and the product samples. For example, the service provider server may determine that both the slow cooker and the soup sample are located in the same warehouse, which may reduce shipping costs if both were offered together, compared to if they were located in different locations. Additionally, the service provider server may determine that a flavor of a soup sample is particularly popular or selling particularly well, which may provide another factor weighing in favor of (or against) advertising/offering that particular flavor with the slow cooker.

Upon determining the product sample to advertise/offer with the focus product, the service provider server may select, based at least in part on the product sample identifier, a product sample advertisement. To this end, the service provider server may transmit the product sample advertisement to the web browser of the user device. The product sample advertisement may include instructions that cause another request to be made (e.g., by the web browser of the user device) to the service provider server. Such a request may include the focus product identifier and the product sample identifier, and may be made for the purpose of determining certain product status information associated with the focus product and the product sample. Such status information may include, but is not limited to, the price(s), the quantities left in inventory, and/or the like associated with the focus product and/or the product sample.

Upon determining the status information associated with the focus product identifier and the product sample identifier, respectively, the service provider server may transmit the status information back to the web browser of the user device. According to one or more embodiments, the product sample advertisement may also include instructions for, and/or otherwise provide for, a user interface, which may be rendered in the web browser. The user interface may display the status information for the focus product and for the product sample. Additionally, the user interface may also enable the user to enter a selection to purchase one or both of the focus products (e.g., the slow cooker) or the product sample (e.g., the soup sample).

In some implementations, the service provider server may determine that the product sample (e.g., the soup sample) is out of stock. As a result, the service provider server may generate, identify, and/or otherwise access a second advertisement. The service provider server may then transmit the second advertisement to the web browser of the user device, which may replace the product sample advertisement (e.g., since the product sample is out of stock).

According to one or more embodiments of the disclosure, in order to implement the broad concepts described above, a method is provided. The method may include receiving, by at least one server comprising one or more processors, from a user device, a request for a web page comprising product detail information associated with a focus product identifier associated with a focus product. The method may also include transmitting the web page to the user device and receiving an advertisement request associated with the focus product identifier. Furthermore, the method may include determining, in response to the advertisement request and based at least in part on the focus product identifier, a product sample identifier associated with a product sample to offer with the product. Additionally, the method may include generating, based at least in part on the product sample identifier, a product sample advertisement. Furthermore, the method may include transmitting the product sample advertisement to the user device.

According to one or more other embodiments of the disclosure, a device is provided. The device may include at least one memory for storing data and computer-executable instructions. Additionally, the device may also include at least one processor to access the at least one memory and to execute the computer-executable instructions. Furthermore, the at least one processor may be configured to execute the instructions to receive an advertisement request from a user device, the advertisement request comprising contextual information associated with a web page. The at least one processor may also be configured to execute the instructions to determine, in response to the advertisement request and based at least in part on the contextual information, a first identifier associated with a product sample of a first product. Additionally, the at least one processor may be configured to execute the instructions to select, based at least in part on the first identifier, a product sample advertisement associated with the first identifier and transmit the product sample advertisement to the user device.

According to one or more embodiments of the disclosure, a non-transitory computer-readable medium is provided. The non-transitory computer-readable medium may have embodied thereon instructions executable by one or more processors. The instructions may cause the one or more processors to receive an advertisement request from a user device, the advertisement request comprising contextual information associated with a web page. Furthermore, the instructions may cause the one or more processors to determine, in response to the advertisement request and based at least in part on the contextual information, a first identifier associated with a product sample of a first product. Additionally, the instructions may cause the one or more processors to select, based at least in part on the first identifier, a product sample advertisement associated with the first identifier and transmit the product sample advertisement to the user device.

Figure 1:
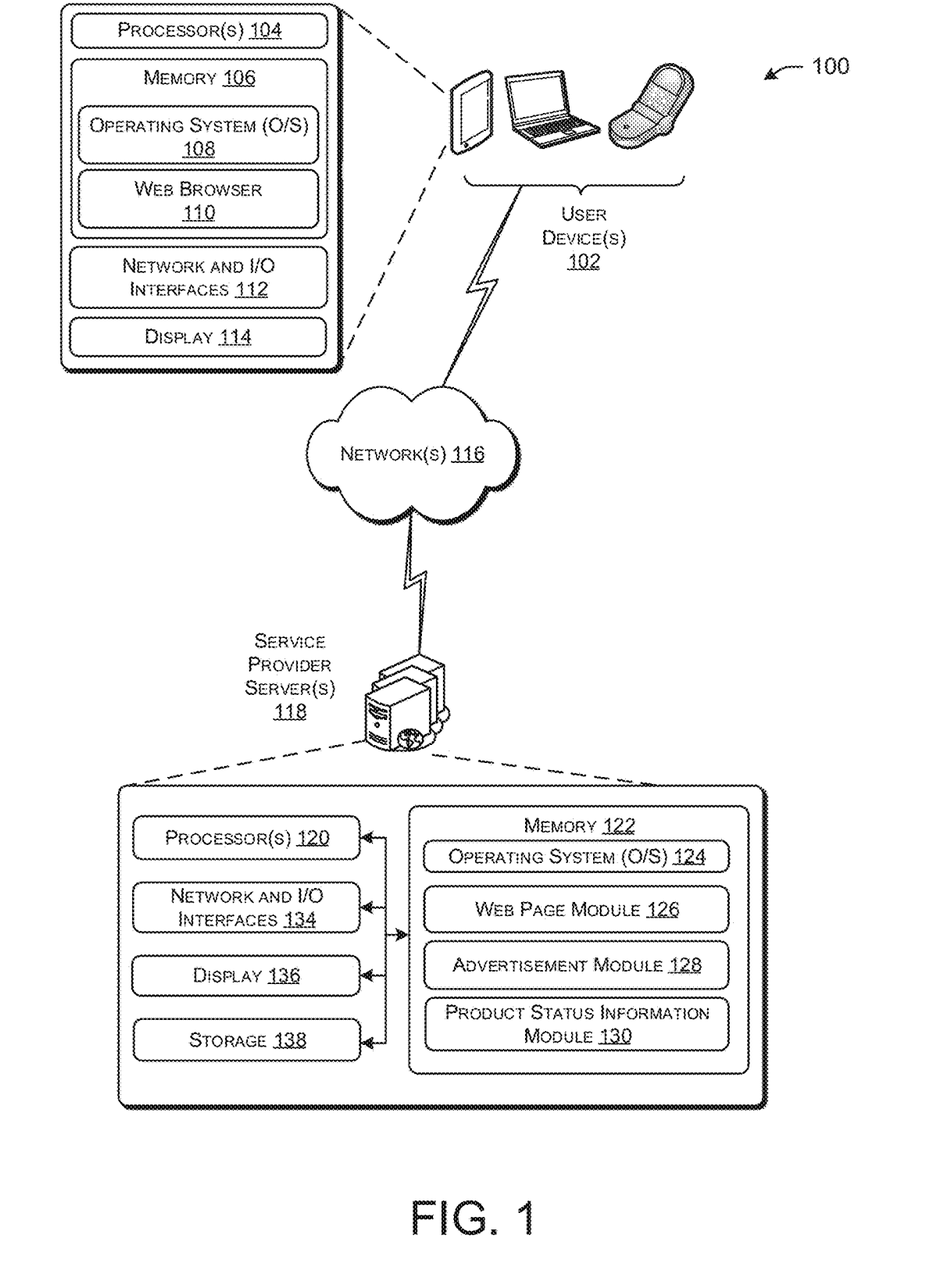
FIG. 1 illustrates a system for managing product sample advertisements in accordance with one or more embodiments of the disclosure.

With reference now to FIG. 1, a system 100 for managing product sample advertisements is shown according to one or more embodiments of the disclosure. The system 100 may include one or more user device(s) 102. In general, the user device 102 may refer to any type of electronic device, and more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The user device(s) 102 may include one or more computer processors 104, a memory 106 storing an operating system 108 and a web browser 110, network and I/O interfaces 112, and a display 114. In certain embodiments, the user device(s) 102 may include one or more sensors capable of gathering information associated with a present environment of the user device(s) 102, or similar hardware devices, such as a camera, microphone, antenna, or Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 104 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may comprise one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the user device 102. The operating system 108 may include any operating system now known or which may be developed in the future including, but not limited to, any server operating system, any mainframe operating system, or any other proprietary or freely available operating system. The memory 106 may also store content that may be displayed by the user device 102 or transferred to other devices (e.g., headphones) to be displayed or played by the other devices. The memory 106 may also store content received from the other devices. The content from the other devices may be displayed, played, or used by the user device 102 to perform any necessary tasks or operations that may be implemented by the computer processor or other components in the user device 102.

Furthermore, the memory 106 may store a web browser 110 to facilitate navigation and/or access to various resources on the Internet, such as one or more web pages served by a service provider server(s) 118 of a service provider. In certain embodiments, the web browser 110 may enable a user of the user device 102 to access a product details web page served by the service provider server(s) 118. As described in more detail below, the product details page may include information regarding a focus product that the user may be interested in.

The network and I/O interfaces 112 may also comprise one or more communication interfaces or network interface devices to provide for the transfer of data between the user device 102 and another device (e.g., network server) via a network (not shown). The communication interfaces may include, but are not limited to, personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in Oct. 2010) and/or the IEEE 802.11 wireless standard (see IEEE 802.11-2007, published Mar. 8, 2007; IEEE 802.11n-2009, published Oct. 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The display 114 may include, but is not limited to, a liquid crystal display, a light-emitted diode display, an E-Ink™ display as made by E Ink Corp. of Cambridge, Mass., or any other similar type of output device. The display 114 may be used to show content to a user in the form of text, images, or video. In certain instances, the display 114 may also operate as a touch screen display that may enable the user to initiate commands or operations by touching the screen using certain finger or hand gestures.

According to one or more embodiments, the user device 102 may be in communication, via one or more networks 116, with one or more service provider server(s) 118. As used herein, unless otherwise specified, the term "server" may refer to any computing device having a networked connectivity and configured to provide one or more dedicated services to clients, such as a user device 102. The services may include storage of data or any kind of data processing.

As such, the service provider server(s) 118 may include one or more processors 120 and a memory 122. The memory 122 may store an operating system 124, a web page module 126, an advertisement module 128, and a product status information module 130. In addition, the service provider server(s) 118 may also include network and I/O interfaces 134, a display 136, and storage 138. While any of the above mentioned components in the user device 102 and the service provider server(s) 118 may hereinafter be referred to in the singular, it will be appreciated that any future references to these components also contemplate them in a plurality.

The processors 120 may comprise one or more cores and may be configured to access and execute (at least in part) computer-readable instructions stored in the memory 122. The one or more computer processors 120 may include, without limitation (and similarly to the processors 104 in the user device 102), a CPU, DSP, RISC, CISC, a microprocessor, a microcontroller, a field programmable gate array (FPGA), or any combination thereof. The service provider server 118 may also include a chipset (not shown) for controlling communications between the one or more processors 120 and one or more of the other components of the service provider server 118. In certain embodiments, the service provider server 118 may be based on an Intel® architecture or an ARM® architecture, and the processor(s) and chipset may be from a family of Intel® processors and chipsets. The one or more processors 120 may also include one or more application-specific integrated circuits (ASICs) or application-specific standard products (ASSPs) for handling specific data processing functions or tasks.

The memory 122 may comprise one or more computer-readable storage media (CRSM). Similar to the memory 106 in the user device 102, the memory 122 may include non-transitory media such as RAM, flash RAM, magnetic media, optical media, solid state media, and so forth. The memory 122 may be volatile or non-volatile and may also be provided as a computer program product including a transitory machine-readable signal (in compressed or uncompressed form). Additionally, the memory 122 may store an operating system 124 that includes a plurality of computer-executable instructions that may be implemented by the computer processor to perform a variety of tasks to operate the interface(s) and any other hardware installed on the service provider server 118. The operating system 124 may include any operating system now known or which may be developed in the future including, but not limited to, any server operating system, any mainframe operating system, or any other proprietary or freely available operating system.

The network and I/O interfaces 134 may also comprise one or more communication interfaces or network interface devices to provide for the transfer of data between the service provider server 118 and another device (e.g., network server) via a network (not shown). The communication interfaces may include, but are not limited to, personal area networks (PANs), wired local area networks (LANs), wireless local area networks (WLANs), wireless wide area networks (WWANs), and so forth. As such, the service provider server 118 may be coupled to the network via a wired connection and/or a wireless connection. The communication interfaces may utilize acoustic, radio frequency, optical, or other signals to exchange data between the service provider server 118 and another device such as an access point, a host computer, a server, a router, a reader device, and the like. The network may include, but is not limited to, the Internet, a private network, a virtual private network, a wireless wide area network, a local area network, a metropolitan area network, a telephone network, and so forth.

The display 136 may include, but is not limited to, a liquid crystal display, a light-emitted diode display, an E-Ink™ display as made by E Ink Corp. of Cambridge, Mass., or any other similar type of output device. The display 136 may be used to show content to a user in the form of text, images, or video. In certain instances, the display 136 may also operate as a touch screen display that may enable the user to initiate commands or operations by touching the screen using certain finger or hand gestures.

The service provider server 118 may further comprise storage 138, such as removable storage and/or non-removable storage including, but not limited to, magnetic storage, optical disk storage, and/or tape storage. Storage 138 may provide non-transient storage of computer-executable instructions and other data. The storage 138 may include storage that is internal and/or external to the user service provider server 118.

As previously mentioned, the memory 122 may store a web page module 126, an advertisement module 128, and a product status information module 130. In general terms, these various modules may communicate with each other and/or with the user device 102 to select, render, generate and/or transmit product sample advertisements based on contextual information associated with the web page and/or focus products, as described in more detail below.

For example, a user of the user device 102 may interact with the web browser 110 to navigate to, load, and/or otherwise request access of a web page provided by the service provider server 118 of a service provider. According to one or more embodiments, the web page may include information associated with a product that the user is interested in (e.g., hereinafter referred to as a "focus product"). For instance, the focus product may be a slow cooker, and the web page may be a details page that includes focus product information associated with the slower cooker. The focus product information may include any data related to the product including, but not limited to, size, weight, color, features, price, and/or the like.

The service provider server 118 may receive the web page request, such as by the web page module 126. As such, the web page module 126 may retrieve the web page, such as from memory 122, storage 138, and/or any other storage location and transmit the web page to the user device 102. Upon receipt of the web page, the user device 102 may load, and/or otherwise process the web page using the web browser 110. To this end, the web page may include computer-executable instructions that instruct the user device 102 (e.g., via the web browser 110) to request an advertisement to be loaded in the web browser 110. As a result, the web browser 110 may be configured to determine contextual information associated with the focus product (e.g., the slow cooker). Upon this determination, the web browser 110 may transmit the advertisement request and the contextual information to the service provider server 118. In certain implementations, the advertisement request may include the contextual information. In other implementations, the contextual information may include a focus product identifier associated with the focus product.

The service provider server 118 may receive the advertisement request and the focus product identifier, such as by the advertisement module 128. Upon receipt, the advertisement module 128 may be configured to determine, based at least in part on the focus product identifier, that a product sample is to be offered with the focus product. To this end, the advertisement module 128 may determine a product sample identifier associated with the product sample and select a product sample advertisement based on the product sample identifier. For example, if the focus product is a slow cooker, the advertisement module 128 may determine that a product sample, such as a soup sample, should be offered with the slow cooker. As a result, the advertisement module 128 may select a product sample advertisement associated with the soup sample to be eventually displayed with the slow cooker on the web page. The product samples may be offered as free samples or alternatively, may be offered at a price. Furthermore, the product samples associated with a product may be of a smaller size and/or serving quantity than how the product is typically offered for sale by the service provider.

In addition, various other factors may be considered in determining and/or generating a product sample advertisement. For instance, a seller may have agreed to certain terms in one or more advertising campaigns with the service provider. To this end, the service provider server 118 may be configured to store one or more parameters associated with the terms of those advertising campaigns, such as in the memory 122, the storage 138, and/or any other storage location or data center. Such parameters may include particular product identifiers with which, and/or product categories in which, the seller may wish to offer/advertise product samples. As an example, a soup manufacturer may establish an advertising campaign with the service provider with parameters that indicate the soup sample should be offered with slow cookers.

In certain implementations, one or more warehouse locations associated with the focus product and/or the product sample may also be considered in determining and/or selecting a product sample advertisement. For instance, the cost associated with the focus product and the product sample being in the same warehouse location may be less than the cost if they are located in different warehouse locations. Thus, a first product sample located in the same warehouse as a focus product may be designated for a product sample advertisement over a second product sample, which is located in a different warehouse than the focus product. It will be appreciated that numerous other criteria may also be considered in such determinations, and may include, but are not limited to, inventory availability, price, sales history, consumer ratings, and popularity.

Upon generation of the product sample advertisement (e.g., of the soup sample), the service provider server 118 may transmit the product sample advertisement to the web browser 110 of the user device 102. In some embodiments, the product sample advertisement may include computer-executable instructions, which cause the web browser 110 to transmit another request to the service provider server 118. This request may be a request for product status information associated with one or both of the focus products (e.g., the slow cooker) or the product sample (e.g., the soup sample). For example, the user device 102 may be configured to determine, based on the product sample advertisement and/or the web page, the focus product identifier and the product sample identifier. The user device 102 may then be configured to transmit the focus product identifier and the product sample identifier to the service provider server 118 as part of a product status information request.

According to exemplary embodiments, the service provider server 118 may receive the product status information request, such as by the product status information module 130. Upon receipt, the product status information module 130 may determine, based on the focus product identifier, focus product status information. The product status information module 130 may also determine, based on the product sample identifier, product sample status information. For example, status information may include the price of the focus product and/or the product sample, and whether the focus product and/or the product sample are in stock.

In certain implementations, if the product status information module 130 determines that the product sample is out of stock, the product status information module 130 may transmit, to the advertisement module 128, a request for another advertisement. In response to this request, the advertisement module 128 may select, render, generate, and/or otherwise provide a second advertisement (e.g., a backup advertisement). The second advertisement may be selected based on another product sample identifier for another product sample, or alternatively, the second advertisement may be a generic, static advertisement for any type of product.

If on the other hand, the product status information module 130 determines that the product sample (e.g., the soup sample) is still in stock, the product status information module 130 may transmit the focus product information and the product sample information back to the web browser 110 in the user device 102. Upon receipt, the web browser 110 may be configured to render and/or display the product sample advertisement with the focus product. Such a display may also include the product sample information and the focus product information. Furthermore, according to some embodiments, the product sample advertisement may also include data associated with a user interface (not pictured). The user interface may enable the user to select one or both of the focus product and/or the product sample for purchase. For example, the user interface may include focus product information associated with the slow cooker and product sample information associated with the soup sample. In addition, the user interface may include selectable components, such as buttons, radials, menus, dials, and/or the like that enable the user to add the slow cooker and/or the soup sample to his/her purchase.

According to other embodiments, if the user selects to purchase the product sample, the service provider server 118 may be configured to determine if the user has previously purchased and/or received the product sample. If the user has indeed previously purchased and/or received the product sample, the service provider server 118 may transmit a notification to the user device 102 indicating that the user is ineligible to receive the product sample. For instance, if the user selects to purchase the soup sample, the product sample identifier associated with the soup sample and a user identifier associated with the user may be transmitted to the service provider server 118. As a result, the service provider server 118 may be configured to access a purchase history of the user, based at least in part on the user identifier. The service provider server 118 may then determine whether the purchase history of the user includes data matching the product sample identifier. If a match exists, the service provider server 118 may indicate a positive determination that the user has previously purchased/received the product sample and further indicate the user's ineligibility to receive another product sample.

In yet other embodiments, if the user successfully purchases the product sample (e.g., in addition to the focus product), the service provider server 118 may be configured to transmit a follow-up communication to the user device 102. The follow-up communication (e.g., an email, a text message, a phone call, and/or the like) may inquire whether the user would like to purchase one or more quantities of the product represented by the product sample. The follow-up communication may further include a user interface that enables the user to purchase the one or more quantities of the product. For example, the user may successfully purchase a soup sample, which may be offered in a single serving size amount. After a predetermined amount of time (e.g., 1 week), the service provider server 118 may transmit a follow-up communication to the user device 102 which inquires whether the user would like to purchase one or more quantities of the same flavor of soup as the soup sample.

It will be appreciated that while the service provider server 118 has been described with reference to generating a single product sample advertisement for a focus product, the service provider server 118 may also be configured to select, render, generate, and/or otherwise provide multiple product sample advertisements for the focus product. Furthermore, the service provider server 118 may also be configured to select a product advertisement that is associated with multiple product sample identifiers of multiple product samples. As such, a user may be able to select which of the product samples he/she would like to include in a purchase of the focus product. For example, with respect to the slow cooker, the service provider server 118 may select a product sample advertisement that includes multiple different flavors of soup samples. To this end, the product sample advertisement may include a user interface that enables a user to select which of the flavors to include in the purchase of the slow cooker.

It will be further appreciated that while FIG. 1 illustrates the service provider server 118 as including various modules, in other embodiments, such modules may be dispersed among different servers and/or other devices in communication with each other. In other words, the service provider server 118 may be a collection of multiple servers that perform any combination of the functions of the modules illustrated in the service provider server 118.

Figure 2:
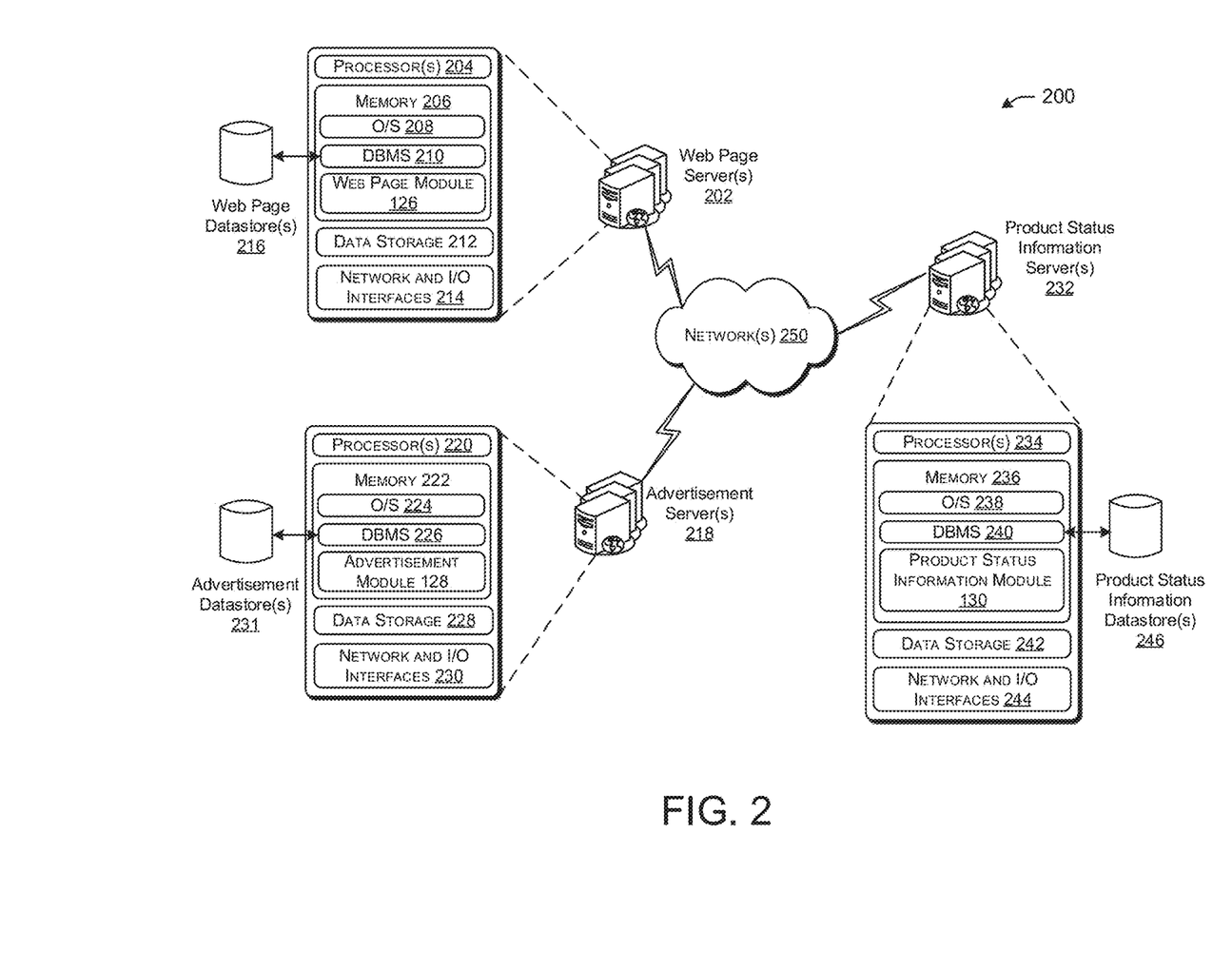
FIG. 2 illustrates a system for managing product sample advertisements in accordance with one or more embodiments of the disclosure.

For example, FIG. 2 illustrates a system 200 that includes a web page server 202, an advertisement server 218, and a product information server 232 in communication with each other through one or more networks 250. According to certain embodiments, these servers may collectively perform the functions described above with reference to the service provider server 118 of FIG. 1.

The web page server 202 may include one or more processors 204, one or more memory devices 206 (generically referred to herein as memory 206), data storage 212, and one or more network and I/O interface(s) 214. For ease of explanation, the web page server 202 will be referred to hereinafter in the singular. However, it should be appreciated that multiple user web page servers 202 may be provided.

The processor(s) 204 may be configured to access the memory 206 and execute computer-executable instructions stored therein. For example, the processor(s) 204 may be configured to execute computer-executable instructions of the various program modules of the web page server 202 to cause or facilitate various operations to be performed in accordance with one or more embodiments of the disclosure. The processor(s) 204 may include any suitable processing unit capable of accepting digital data as input, processing the input data in accordance with stored computer-executable instructions, and generating output data. The processor(s) 204 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The memory 206 may include volatile memory such as random access memory (RAM) and/or non-volatile memory such as read-only memory (ROM), flash memory, and so forth. In various implementations, the memory 206 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 206 may store computer-executable instructions that are loadable and executable by the processor(s) 204, as well as data manipulated and/or generated by the processor(s) 204 during the execution of the computer-executable instructions. For example, the memory 206 may store one or more operating systems (O/S) 208; one or more database management systems (DBMS) 210; and one or more program modules, applications, or the like such as, for example, one or more web page module(s) 126. The various illustrative program modules depicted as being loaded into the memory 206 may include computer-executable instructions that, responsive to execution, may cause various processing to be performed. In order to perform such processing, the program modules may utilize various data stored in the memory 206, in the data storage 212, and/or in one or more external datastores, such as web page datastore(s) 216.

The (O/S) 208 loaded into the memory 206 may provide an interface between other application software executing on the web page server 202 and the hardware resources of the web page server 202. More specifically, the O/S 208 may include a set of computer-executable instructions for managing hardware resources of the web page server 202 and for providing common services to other application programs (e.g., managing memory allocation among various application programs). The O/S 208 may include any operating system now known or which may be developed in the future including, but not limited to, any server operating system, any mainframe operating system, or any other proprietary or freely available operating system.

It should be appreciated that any data and/or computer-executable instructions stored in the memory 206 may be additionally, or alternatively, stored in the data storage 212 and/or in one or more other datastores. The DBMS 210 depicted as being loaded into the memory 206 may support functionality for accessing, retrieving, storing, and/or manipulating data stored in external datastore(s) (e.g., the web page datastore(s) 216), data stored in the memory 206, and/or data stored in the data storage 212. For example, the DBMS 210 may be configured to retrieve user account data (e.g., inventory associated with the user account) from the web page datastores 216 responsive to receipt of the request from the web page server 202. The DBMS 210 may use any of a variety of database models (e.g., relational model, object model, etc.) and may support any of a variety of query languages.

As previously noted, the network and I/O interfaces 214 may also comprise one or more communication interfaces or network interface devices to provide for the transfer of data between the web page server 202 and another device (e.g., network server) via a network (not shown). The communication interfaces may include, but are not limited to, personal area networks (PANs), wired local area networks (LANs), wireless local area networks (WLANs), wireless wide area networks (WWANs), and so forth. The web page server 202 may be coupled to the network via a wired connection and/or a wireless connection. The communication interfaces may utilize acoustic, radio frequency, optical, or other signals to exchange data between the web page server 202 and another device such as an access point, a host computer, a server, a router, a reader device, and the like. The network may include, but is not limited to, the Internet, a private network, a virtual private network, a wireless wide area network, a local area network, a metropolitan area network, a telephone network, and so forth.

According to one or more example embodiments, computer-executable instructions provided as part of the web page module 126 may be configured to generate, transmit, and/or otherwise provide a web page to the user device 102. As previously discussed, the web page may include information associated with a focus product, and in particular, may be a product details page associated with the focus product. Furthermore, the web page may include certain computer-executable instructions that cause the user device 102 (e.g., via the web browser 110) to transmit an advertisement request to the advertisement server 218.

Referring now to other components of the system 200, the advertisement server 218 may include one or more processors 220, one or more memory devices 222 (generically referred to herein as memory 222), data storage 228, and one or more network and I/O interface(s) 230. For ease of explanation, the advertisement server 218 will be referred to hereinafter in the singular. However, it should be appreciated that multiple user advertisement servers 218 may be provided.

The processor(s) 220 may be configured to access the memory 222 and execute computer-executable instructions stored therein. For example, the processor(s) 220 may be configured to execute computer-executable instructions of the various program modules of the advertisement server 218 to cause or facilitate various operations to be performed in accordance with one or more embodiments of the disclosure. The processor(s) 220 may include any suitable processing unit capable of accepting digital data as input, processing the input data in accordance with stored computer-executable instructions, and generating output data. The processor(s) 220 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The memory 222 may include volatile memory such as random access memory (RAM) and/or non-volatile memory such as read-only memory (ROM), flash memory, and so forth. In various implementations, the memory 222 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 222 may store computer-executable instructions that are loadable and executable by the processor(s) 220, as well as data manipulated and/or generated by the processor(s) 220 during the execution of the computer-executable instructions. For example, the memory 222 may store one or more operating systems (O/S) 224; one or more database management systems (DBMS) 226; and one or more program modules, applications, or the like such as, for example, one or more advertisement module(s) 128. The various illustrative program modules depicted as being loaded into the memory 222 may include computer-executable instructions that, responsive to execution, may cause various processing to be performed. In order to perform such processing, the program modules may utilize various data stored in the memory 222, in the data storage 228, and/or in one or more external datastores, such as advertisement datastore(s) 231.

The O/S 224 loaded into the memory 222 may provide an interface between other application software executing on the advertisement server 218 and the hardware resources of the advertisement server 218. More specifically, the O/S 224 may include a set of computer-executable instructions for managing the hardware resources of the advertisement server 218 and for providing common services to other application programs (e.g., managing memory allocation among various application programs). The O/S 224 may include any operating system now known or which may be developed in the future including, but not limited to, any server operating system, any mainframe operating system, or any other proprietary or freely available operating system.

It should be appreciated that any data and/or computer-executable instructions stored in the memory 222 may be additionally, or alternatively, stored in the data storage 228 and/or in one or more other datastores. The DBMS 226 depicted as being loaded into the memory 222 may support functionality for accessing, retrieving, storing, and/or manipulating data stored in external datastore(s) (e.g., the advertisement datastore(s) 231), data stored in the memory 222, and/or data stored in the data storage 228. For example, the DBMS 226 may be configured to retrieve user account data (e.g., inventory associated with the user account) from advertisement datastores 231 responsive to receipt of the request from the advertisement server 218. The DBMS 226 may use any of a variety of database models (e.g., relational model, object model, etc.) and may support any of a variety of query languages.

As previously noted, the network and I/O interfaces 230 may also comprise one or more communication interfaces or network interface devices to provide for the transfer of data between the advertisement server 218 and another device (e.g., network server) via a network (not shown). The communication interfaces may include, but are not limited to, personal area networks (PANs), wired local area networks (LANs), wireless local area networks (WLANs), wireless wide area networks (WWANs), and so forth. The advertisement server 218 may be coupled to the network via a wired connection and/or a wireless connection. The communication interfaces may utilize acoustic, radio frequency, optical, or other signals to exchange data between the advertisement server 218 and another device such as an access point, a host computer, a server, a router, a reader device, and the like. The network may include, but is not limited to, the Internet, a private network, a virtual private network, a wireless wide area network, a local area network, a metropolitan area network, a telephone network, and so forth.

According to one or more example embodiments, the computer-executable instructions provided as part of the advertisement module 128 may be configured to receive an advertisement request from the web page module 126 of the web page server 202. The advertisement request may include, and/or may otherwise be associated with, a focus product identifier associated with a focus product. To this end, the advertisement module 128 may be configured to determine, based at least in part on the focus product identifier, a product sample identifier of a product sample to offer/advertise with the focus product on the web page. Upon this determination, the advertisement module 128 may select, render, generate, and/or otherwise provide a product sample advertisement associated with the product sample advertisement. The advertisement module 128 may transmit the product sample advertisement to the user device 102.

Additionally, the product sample advertisement may include certain computer-executable instructions that cause the user device 102 to transmit (e.g., via the web browser 110), to the product status information server 232, one or more product status information requests associated with the focus product identifier and/or the product sample identifier.

Referring now to other components of the system 200, the product status information server 232 may include one or more processors 234, one or more memory devices 236 (generically referred to herein as memory 236), data storage 242, and one or more network and I/O interface(s) 244. For ease of explanation, the product status information server 232 will be referred to hereinafter in the singular. However, it should be appreciated that multiple user product status information servers 232 may be provided.

The processor(s) 234 may be configured to access the memory 236 and execute computer-executable instructions stored therein. For example, the processor(s) 234 may be configured to execute computer-executable instructions of the various program modules of the product status information server 232 to cause or facilitate various operations to be performed in accordance with one or more embodiments of the disclosure. The processor(s) 234 may include any suitable processing unit capable of accepting digital data as input, processing the input data in accordance with stored computer-executable instructions, and generating output data. The processor(s) 234 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The memory 236 may include volatile memory such as random access memory (RAM) and/or non-volatile memory such as read-only memory (ROM), flash memory, and so forth. In various implementations, the memory 236 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 236 may store computer-executable instructions that are loadable and executable by the processor(s) 234, as well as data manipulated and/or generated by the processor(s) 234 during the execution of the computer-executable instructions. For example, the memory 236 may store one or more operating systems (O/S) 238; one or more database management systems (DBMS) 240; and one or more program modules, applications, or the like such as, for example, one or more product status information module(s) 130. The various illustrative program modules depicted as being loaded into the memory 234 may include computer-executable instructions that, responsive to execution, may cause various processing to be performed. In order to perform such processing, the program modules may utilize various data stored in the memory 236, in the data storage 242, and/or in one or more external datastores, such as product status information datastore(s) 246.

The O/S 238 loaded into the memory 236 may provide an interface between other application software executing on the product status information server 232 and the hardware resources of the product status information server 232. More specifically, the O/S 238 may include a set of computer-executable instructions for managing hardware resources of the product status information server 232 and for providing common services to other application programs (e.g., managing memory allocation among various application programs). The O/S 238 may include any operating system now known or which may be developed in the future including, but not limited to, any server operating system, any mainframe operating system, or any other proprietary or freely available operating system.

It should be appreciated that any data and/or computer-executable instructions stored in the memory 236 may be additionally, or alternatively, stored in the data storage 242 and/or in one or more other datastores. The DBMS 240 depicted as being loaded into the memory 236 may support functionality for accessing, retrieving, storing, and/or manipulating data stored in external datastore(s) (e.g., the product status information datastore(s) 246), data stored in the memory 236, and/or data stored in the data storage 242. For example, the DBMS 240 may be configured to retrieve user account data (e.g., inventory associated with the user account) from product status information datastores 246 responsive to receipt of the request from the product status information server 232. The DBMS 240 may use any of a variety of database models (e.g., relational model, object model, etc.) and may support any of a variety of query languages.

As previously noted, the network and I/O interfaces 244 may also comprise one or more communication interfaces or network interface devices to provide for the transfer of data between the product status information server 232 and another device (e.g., network server) via a network (not shown). The communication interfaces may include, but are not limited to, personal area networks (PANs), wired local area networks (LANs), wireless local area networks (WLANs), wireless wide area networks (WWANs), and so forth. The product status information server 232 may be coupled to the network via a wired connection and/or a wireless connection. The communication interfaces may utilize acoustic, radio frequency, optical, or other signals to exchange data between the product status information server 232 and another device such as an access point, a host computer, a server, a router, a reader device, and the like. The network may include, but is not limited to, the Internet, a private network, a virtual private network, a wireless wide area network, a local area network, a metropolitan area network, a telephone network, and so forth.

According to one or more example embodiments, computer-executable instructions provided as part of the product status information module 130 may be configured to receive a product status information request from the user device 102. In certain implementations, the product status information request may include the focus product identifier and the product sample identifier. Based at least in part on these identifiers, the product status information module 130 may determine focus product status information and product sample status information, respectively. For instance, focus product status information may include a price, a quantity, and/or various other types of data associated with the focus product. The product sample status information may include a price, a quantity, and/or various other types of data associated with the product sample. The product status information module 130 may further be configured to transmit the focus product status information and the product sample status information back to the web browser 110 of the user device 102.

Figure 3:
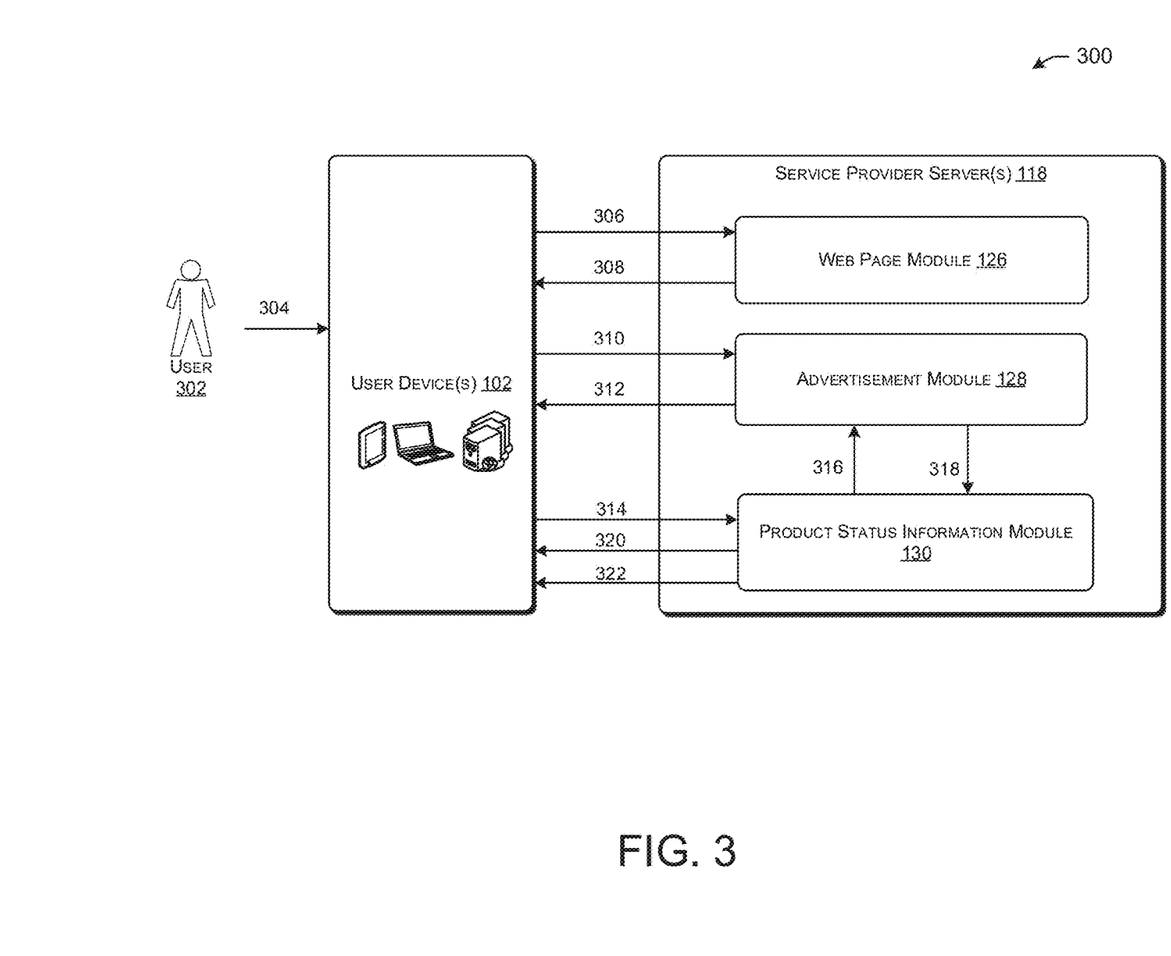
FIG. 3 illustrates a block diagram of a data flow for managing product sample advertisements in accordance with one or more embodiments of the disclosure.

Referring now to FIG. 3, a block diagram of a data flow 300 for managing product sample advertisements is illustrated according to one or more example embodiments. According to the data flow 300, a user 302 may transmit an indication 304 to the user device 102 to navigate to a web page provided by the service provider server 118. As previously discussed, the web page may include information associated with a focus product that the user 302 is interested in, such as the product details page of the focus product.

Thus, upon receiving the user indication 304, the user device 102 may transmit a request 306, to the web page module 126, for the web page. In response, the web page module 126 may transmit 308 the requested web page back to the user device 102. The web page may include computer-executable instructions to display an advertisement on the web page. These computer-executable instructions may cause the user device 102 to transmit an advertisement request 310 to the advertisement module 128 in the service provider server 118. In certain embodiments, the advertisement request 310 may include a focus product identifier associated with the focus product. The advertisement module 128 may receive the advertisement request 310 and determine, based at least in part on the focus product identifier, a product sample identifier associated with a product sample to offer/advertise in conjunction with the focus product. As such, the advertisement module 128 may select, based at least in part on the product sample identifier, a product sample advertisement. The advertisement module 128 may be configured to transmit the product sample advertisement 312 back to the user device 102.

The product sample advertisement 312 may include computer-executable instructions that cause the user device 102 (e.g., via the web browser 110) to transmit a product status information request 314 to the product status information module 130. The product status information request 314 may include and/or may otherwise be associated with the focus product identifier and/or the product sample identifier. As such, in response to the product status information request 314, the product status information module 130 may determine, based at least in part on the focus product identifier and the product sample identifier, focus product status information and product sample status information, respectively.

Based upon the product sample status information, the product status information module 130 may determine the quantity of the product sample (e.g., associated with the product sample identifier) in stock. If the product status information module 130 determines that there are product samples in stock, the focus product status information and the product sample status information may be transmitted 320 to the user device 102. On the other hand, if the product status information module 130 determines that there are no product samples in stock, the product status information module 130 may transmit a second advertisement request 316 to the advertisement module 128. In response to the second advertisement request 315, the advertisement module 128 may select a second advertisement and transmit the second advertisement 318 to the product status information module 130. As a result, the product status information module 130 may transmit 322 the second advertisement back to the user device 102.

Figure 4:
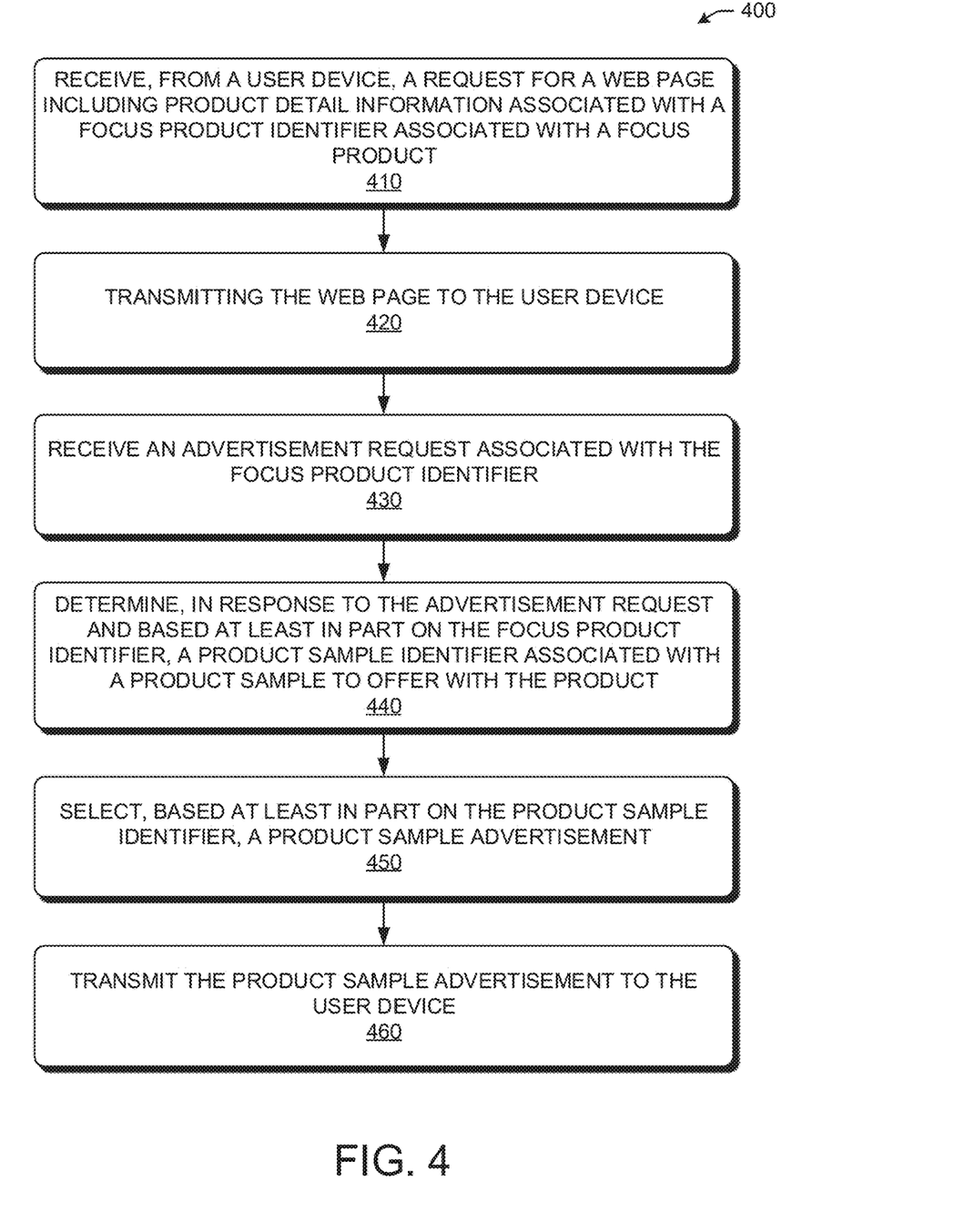
FIG. 4 illustrates a flow diagram for managing product sample advertisements in accordance with one or more embodiments of the disclosure.

Referring now to FIG. 4, a flow diagram of a method 400 for managing product sample advertisements is illustrated according to one or more example embodiments. The method 400 may begin in block 410, where a web page module 126 may receive, from a user device 102, a request for a web page. The web page may include product detail information associated with a focus product identifier associated with a focus product. In block 420, the web page module 126 may be configured to transmit the web page to the user device 102.

In block 430, the advertisement module 128 may be configured to receive an advertisement request associated with the focus product identifier. In block 440, the advertisement module 128 may be configured to determine, in response to the advertisement request and based at least in part on the focus product identifier, a product sample identifier associated with a product sample to offer with the product. As such, in block 450, the advertisement module 128 may be configured to select, based at least in part on the product sample identifier, a product sample advertisement. In block 460, the advertisement module 128 may be configured to transmit the product sample advertisement to the user device 102.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method, comprising:
    receiving, by at least one server comprising one or more processors and over at least one network, from a user device, a request for a web page comprising product detail information for a focus product associated with a focus product identifier;
    transmitting, over the at least one network, the web page to the user device;
    receiving, over the at least one network, a first request for an advertisement, wherein the first request comprises the focus product identifier;
    transmitting, based at least in part on the focus product identifier, a second request for one or more product samples associated with the focus product identifier;
    receiving a set of sample product identifiers comprising a first product sample identifier for a first sample product associated with the focus product identifier, and a second product sample identifier for a second sample product associated with the focus product identifier;
    determining a first physical location of the focus product in a facility;
    determining a second physical location of the first sample product in the facility;
    determining a third physical location of the second sample product in the facility;
    determining that a distance between the third physical location and the first physical location is less than a distance between the second physical location and the first physical location;
    determining, based at least in part on the first request and the focus product identifier, the second product sample identifier for inclusion as a free sample with the focus product;
    selecting the advertisement, wherein the advertisement is associated with the focus product identifier and the second product sample identifier;
    transmitting, over the at least one network, the advertisement to the user device, wherein data associated with the advertisement comprises instructions to:
        request status information associated with the focus product identifier and the second product sample identifier; and
        display, in a user interface of the advertisement, the status information, product sample information associated with the second product sample identifier, and focus product information associated with the focus product identifier;
    receiving, based at least in part on the instructions of the advertisement, a request for the status information;
    transmitting the status information to the user device for presentation in the user interface; and
    receiving, from the user interface of the advertisement displayed on the user device, a user indication to purchase the focus product and the second product sample.

2. The method of claim 1, wherein the advertisement is a first advertisement, and the method further comprises:
    determining, based at least in part on the first product sample identifier, that the first product sample is out of stock.

3. The method of claim 1, further comprising:
determining, based at least in part on a user identifier associated with a user of the user device, purchase history information associated with the user; and
determining, based at least in part on the purchase history information, whether the user has received a previous product sample associated with the first product sample identifier.

4. The method of claim 3, further comprising:
transmitting, to the user device upon a positive determination that the user has received the previous product sample, an indication that the user is ineligible to receive the first product sample.

5. The method of claim 3, further comprising:
transmitting, to the user device upon a positive determination that the user has received the previous product sample, a purchase recommendation to purchase one or more quantities of a product associated with the first product sample.

6. A system, comprising:
at least one processor; and
at least one memory storing computer-executable instructions, that when executed by the at least one processor, causes the at least one processor to:
receive, over at least one network, a first request for an advertisement from a user device, the first request comprising contextual information associated with a web page, the contextual information being for a product, wherein the contextual information comprises a first identifier for the product;
transmit, based at least in part on the first identifier, a second request for one or more product samples associated with the first identifier;
receive a set of sample product identifiers comprising a first product sample identifier for a first sample product associated with the first identifier, and a second product sample identifier for a second sample product associated with the first identifier;
determine a first physical location of the product in a facility;
determine a second physical location of the first sample product in the facility;
determine a third physical location of the second sample product in the facility;
determine that a distance between the third physical location and the first physical location is less than a distance between the second physical location and the first physical location;
determine, based at least in part on the first request and first identifier, the second product sample identifier for inclusion as a free sample with the product;
select the advertisement, wherein the advertisement is associated with the first identifier and the second product sample identifier;
transmit, over the at least one network, the advertisement to the user device, wherein data associated with the advertisement comprises instructions to:
request status information associated with the first identifier and the second product sample identifier; and
display, in a user interface of the advertisement, the status information;
receive, based at least in part on the instructions of the advertisement, a request for the status information;
transmit the status information to the user device for presentation in the user interface; and
receive, from the user interface of the advertisement displayed on the user device, a user indication to purchase the focus product and the second product sample.

7. The system of claim 6, wherein the computer-executable instructions further cause the at least one processor to:
determine the first identifier associated with the product from the contextual information.

8. The system of claim 6, wherein the web page comprises product detail information associated with the product.

9. The system of claim 6, wherein the computer-executable instructions further comprises instructions to:
determine that the first identifier and the second product sample identifier are associated with the same warehouse location.

10. The system of claim 6, wherein the advertisement is a first advertisement, and wherein the computer-executable instructions further cause the at least one processor to:
determine, based at least in part on the second identifier, that the first product sample is out of stock.

11. The system of claim 6, wherein the computer-executable instructions further cause the at least one processor to:
determine, based at least in part on a user identifier associated with a user of the user device, purchase history information associated with the user; and
determine, based at least in part on the purchase history information, whether the user has previously received the first product sample.

12. The system of claim 11, wherein the computer-executable instructions further cause the at least one processor to:
transmit, to the user device upon a positive determination that the user has received a previous product sample, an indication that the user is ineligible to receive the first product sample.

13. The system of claim 11, wherein the computer-executable instructions further cause the at least one processor to:
transmit, to the user device upon a positive determination that the user has received a previous product sample, a purchase recommendation to purchase one or more quantities of a product associated with the first product sample.

14. A non-transitory computer readable medium comprising computer-executable instructions that when executed by at least one processor, cause the at least one processor to:
receive, over at least one network, a first request for an advertisement from a user device, the first request comprising contextual information associated with a web page, the contextual information being for a product, wherein the contextual information comprises a first identifier for the product;
transmit, based at least in part on the first identifier, a second request for one or more product samples associated with the first identifier;
receive a set of sample product identifiers comprising a first product sample identifier for a first sample product associated with the first identifier, and a second product sample identifier for a second sample product associated with the first identifier;
determine a first physical location of the product in a facility;
determine a second physical location of the first sample product in the facility;
determine a third physical location of the second sample product in the facility;

determine that a distance between the third physical location and the first physical location is less than a distance between the second physical location and the first physical location;

determine, based at least in part on the first request and first identifier, the second product sample identifier for inclusion as a free sample with the product;

select the advertisement, wherein the advertisement is associated with the first identifier and the second identifier;

transmit, over the at least one network, the advertisement to the user device, wherein data associated with the advertisement comprises instructions to:
  request status information associated with the first identifier and the second identifier; and
  display, in a user interface of the advertisement, the status information, product information associated with the first identifier, and product sample information associated with the second identifier;

receive, based at least in part on the instructions of the advertisement, a request for the status information;

transmit the status information to the user device for presentation in the user interface; and receive, from the user interface of the advertisement displayed on the user device, a user indication to purchase the focus product and the second product sample.

15. The computer readable medium of claim 14, wherein the computer-executable instructions further cause the at least one processor to:
  determine the first identifier associated with the product from the contextual information.

16. The computer readable medium of claim 14, wherein the web page comprises product detail information associated with the product.

17. The computer readable medium of claim 14, wherein the computer-executable instructions further comprises instructions to:
  determine that the first identifier and the second product sample identifier are associated with the same warehouse location.

18. The computer readable medium of claim 14, wherein the advertisement is a first advertisement, and wherein the computer-executable instructions further cause the at least one processor to:
  determine, based at least in part on the second identifier, that the first product sample is out of stock.

19. The computer readable medium of claim 14, wherein the computer-executable instructions further cause the at least one processor to:
  determine, based at least in part on a user identifier associated with a user of the user device, purchase history information associated with the user; and
  determine, based at least in part on the purchase history information, whether the user has previously received the first product sample.

20. The computer readable medium of claim 19, wherein the computer-executable instructions further cause the at least one processor to:
  transmit, to the user device upon a positive determination that the user has received a previous product sample, an indication that the user is ineligible to receive the first product sample.

21. The computer readable medium of claim 19, wherein the computer-executable instructions further cause the at least one processor to:
  transmit, to the user device upon a positive determination that the user has received a previous product sample, a purchase recommendation to purchase one or more quantities of a product associated with the first product sample.

\* \* \* \* \*